(12) United States Patent
Brophy et al.

(10) Patent No.: US 11,051,539 B2
(45) Date of Patent: Jul. 6, 2021

(54) LOW SODIUM SALT SUBSTITUTE WITH POTASSIUM CHLORIDE

(71) Applicant: S & P INGREDIENT DEVELOPMENT, LLC, Minnetonka, MN (US)

(72) Inventors: James S. Brophy, Independence, MN (US); Frank E. Davis, Oakbrook Terrace, IL (US); Sambasiva Rao Chigurupati, Omaha, NE (US); Chris Trotter, Fargo, ND (US)

(73) Assignee: S & P INGREDIENT DEVELOPMENT, LLC, Minnetonka, MN (US)

( * ) Notice: Subject to any disclaimer, the term of this patent is extended or adjusted under 35 U.S.C. 154(b) by 0 days.

(21) Appl. No.: 16/347,288

(22) PCT Filed: Jun. 15, 2018

(86) PCT No.: PCT/US2018/037857
§ 371 (c)(1),
(2) Date: May 3, 2019

(87) PCT Pub. No.: WO2019/055082
PCT Pub. Date: Mar. 21, 2019

(65) Prior Publication Data
US 2019/0281875 A1    Sep. 19, 2019

Related U.S. Application Data

(60) Provisional application No. 62/560,117, filed on Sep. 18, 2017.

(51) Int. Cl.
*A23L 1/22*    (2006.01)
*A23L 1/237*    (2006.01)
(Continued)

(52) U.S. Cl.
CPC ............... *A23L 27/45* (2016.08); *A23L 27/40* (2016.08); *A23L 29/294* (2016.08); *A23L 33/10* (2016.08); *A23L 33/16* (2016.08); *A23V 2002/00* (2013.01)

(58) Field of Classification Search
CPC .......... A23L 27/40; A23L 27/45; A23L 27/82; A23L 33/16; Y10S 426/806
See application file for complete search history.

(56) References Cited

U.S. PATENT DOCUMENTS

| 1,874,055 A | 8/1932 | Liebrecht |
| 1,978,040 A | 10/1934 | Daitz |

(Continued)

FOREIGN PATENT DOCUMENTS

| AR | 011559 | 8/2000 |
| CA | 1155330 | 10/1983 |

(Continued)

OTHER PUBLICATIONS

EPA, "40 CFR Part 180 Acrylic Polymers; Tolerance Exemption" Federal Register vol. 81, No. 178, pp. 1-4, Sep. 14, 2016 https://www.federalregister.gov/documents/2016/09/14/2016-20853/acrylic-polymers-tolerance-exemption (Year: 2016).*

(Continued)

*Primary Examiner* — Kelly J Bekker
(74) *Attorney, Agent, or Firm* — Fish & Richardson P.C.

(57) ABSTRACT

Making a salt substitute includes forming a salt substitute precursor, providing the salt substitute precursor to a centrifuge, and centrifuging the salt substitute precursor to yield a salt substitute in the form of a solid and a centrate. The salt substitute precursor includes water, a chloride salt, a food grade acid, and an anticaking agent. The chloride salt includes potassium chloride. A pH of the salt substitute precursor is between 2 and 4, and the salt substitute precur- (Continued)

sor is a saturated or supersaturated solution, a suspension, or a slurry. The salt substitute includes a chloride salt, a food grade acid, and an anticaking agent. The salt substitute includes potassium chloride and is in the form of a crystalline solid including at least 95 wt % of the chloride salt, up to 1 wt % of the food grade acid, and up to 1 wt % of the anticaking agent.

14 Claims, 2 Drawing Sheets

(51) Int. Cl.
*A23L 27/40* (2016.01)
*A23L 33/16* (2016.01)
*A23L 33/10* (2016.01)
*A23L 29/294* (2016.01)

(56) References Cited

U.S. PATENT DOCUMENTS

| | | | |
|---|---|---|---|
| 2,500,919 A | 3/1950 | Cahn et al. | |
| 2,596,333 A | 5/1952 | Halpern et al. | |
| 2,601,112 A | 6/1952 | Louis | |
| 2,742,366 A | 4/1956 | Power | |
| 2,824,008 A | 2/1958 | Perri | |
| 2,829,056 A | 4/1958 | Kemmerer | |
| 2,874,027 A | 2/1959 | Gloss | |
| 2,900,268 A | 8/1959 | Rankin | |
| 2,968,566 A | 1/1961 | Munch | |
| 3,505,082 A | 4/1970 | Miller | |
| 3,514,296 A | 5/1970 | Frank | |
| 3,782,974 A | 1/1974 | Lontz | |
| 3,860,732 A | 1/1975 | Eisenstadt | |
| 4,066,799 A | 1/1978 | Cornelius | |
| 4,068,006 A | 1/1978 | Moritz | |
| 4,076,846 A | 2/1978 | Nakatsuka et al. | |
| 4,216,244 A | 8/1980 | Allen, Jr. | |
| 4,243,691 A | 1/1981 | Mohlenkamp, Jr. et al. | |
| 4,293,535 A | 10/1981 | Arendt | |
| 4,297,375 A | 10/1981 | Shackelford | |
| 4,340,614 A | 7/1982 | Pich | |
| 4,451,494 A | 5/1984 | Roan, III | |
| 4,473,595 A | 9/1984 | Rood | |
| 4,486,456 A | 12/1984 | Thompson | |
| 4,556,566 A | 12/1985 | Bell | |
| 4,556,567 A | 12/1985 | Meyer | |
| 4,556,568 A | 12/1985 | Meyer | |
| 4,556,577 A | 12/1985 | Meyer | |
| 4,556,578 A | 12/1985 | Meyer | |
| 4,560,574 A | 12/1985 | Meyer | |
| 4,734,290 A | 3/1988 | Meyer | |
| 4,748,027 A | 5/1988 | Schou et al. | |
| 4,798,736 A | 1/1989 | Belohlawek | |
| 4,873,108 A | 10/1989 | De Rooij et al. | |
| 4,915,962 A | 4/1990 | Howard | |
| 4,931,305 A | 6/1990 | Karppanen | |
| 4,963,387 A | 10/1990 | Nakagawa | |
| 5,034,378 A | 7/1991 | Cox | |
| 5,064,663 A | 11/1991 | Murray et al. | |
| 5,094,862 A | 3/1992 | Bunick et al. | |
| 5,098,723 A | 3/1992 | DuBois et al. | |
| 5,098,724 A | 3/1992 | DuBois et al. | |
| 5,106,632 A | 4/1992 | Wong et al. | |
| 5,173,323 A | 12/1992 | Omari | |
| 5,213,838 A | 5/1993 | Sheikh et al. | |
| 5,288,510 A | 2/1994 | Gregory et al. | |
| 5,447,543 A | 9/1995 | Sadan | |
| 5,494,689 A | 2/1996 | Lee et al. | |
| 5,562,942 A | 10/1996 | Koh et al. | |
| 5,626,904 A | 5/1997 | Frederiksen | |
| 5,853,792 A | 12/1998 | Zolotov et al. | |
| 5,871,803 A | 2/1999 | Bonorden et al. | |
| 5,897,908 A | 4/1999 | Berglund | |
| 6,013,298 A | 1/2000 | Takano et al. | |
| 6,030,535 A | 2/2000 | Hayashi et al. | |
| 6,048,569 A | 4/2000 | Garcia et al. | |
| 6,090,419 A | 7/2000 | Popplewell et al. | |
| 6,541,050 B1 | 4/2003 | Bonorden | |
| 6,632,467 B1 | 10/2003 | Salvi | |
| 6,743,461 B1 | 6/2004 | Vasquez | |
| 6,753,023 B2 | 6/2004 | Hammond | |
| 6,783,788 B2 | 8/2004 | Kuroda et al. | |
| 6,787,169 B1 | 9/2004 | Maki | |
| 6,926,918 B2 | 8/2005 | LeBlanc | |
| 7,208,189 B2 | 4/2007 | Ghosh | |
| 7,402,328 B2 | 7/2008 | Vasquez | |
| 7,452,563 B2 | 11/2008 | Salemme | |
| 7,455,872 B2 | 11/2008 | Salemme | |
| 7,794,768 B2 | 9/2010 | Dewis | |
| 7,820,225 B2 | 10/2010 | Zuniga | |
| 7,854,956 B2 | 12/2010 | Zuniga | |
| 7,867,520 B2 | 1/2011 | Ikeda | |
| 7,989,016 B2 | 8/2011 | Chigurupati | |
| 8,197,878 B2 | 6/2012 | Chigurupati | |
| 8,231,924 B2 | 7/2012 | Ganesan et al. | |
| 8,231,925 B2 | 7/2012 | Ganesan | |
| 8,329,236 B2 | 12/2012 | Chigurupati | |
| 8,372,463 B2 | 2/2013 | Zuniga | |
| 8,409,653 B2 | 4/2013 | Shimono et al. | |
| 8,435,555 B2 | 5/2013 | Minter et al. | |
| 8,501,253 B2 | 8/2013 | Maeki et al. | |
| 8,802,181 B2 | 8/2014 | Grossbier et al. | |
| 8,932,661 B2 | 1/2015 | Shimono et al. | |
| 8,999,425 B2 | 4/2015 | Meyer | |
| 9,011,963 B2 | 4/2015 | Osterwalder et al. | |
| 9,247,762 B1 | 2/2016 | Chigurupati | |
| 9,474,297 B2 | 10/2016 | Chigurupati | |
| 9,629,384 B2 * | 4/2017 | Bhandari | A23L 27/84 |
| 9,808,030 B2 * | 11/2017 | Johal | A23L 27/40 |
| 2003/0008046 A1 | 1/2003 | Gerlat | |
| 2003/0009857 A1 * | 1/2003 | Mayer | C01D 3/16 23/300 |
| 2003/0143152 A1 | 7/2003 | Vohra et al. | |
| 2003/0175202 A1 | 9/2003 | Mao | |
| 2004/0047976 A1 | 3/2004 | Narayan et al. | |
| 2005/0136131 A1 * | 6/2005 | Dastidar | A61K 31/198 424/680 |
| 2005/0142219 A1 | 6/2005 | Dunuwila | |
| 2006/0024422 A1 | 2/2006 | Bakal | |
| 2006/0115518 A1 | 6/2006 | Tsuchiya et al. | |
| 2007/0059428 A1 | 3/2007 | Chigurupati | |
| 2007/0184176 A1 | 8/2007 | Kuroda | |
| 2007/0292592 A1 | 12/2007 | Zasypkin | |
| 2008/0003339 A1 | 1/2008 | Johnson | |
| 2008/0003344 A1 | 1/2008 | Jensen | |
| 2008/0008790 A1 | 1/2008 | Jensen | |
| 2008/0038411 A1 | 2/2008 | Jensen | |
| 2008/0193591 A1 | 8/2008 | Wada et al. | |
| 2008/0199595 A1 | 8/2008 | Zasypkin et al. | |
| 2009/0041900 A1 | 2/2009 | Zuniga | |
| 2009/0047396 A1 | 2/2009 | Ikeda et al. | |
| 2009/0104330 A1 | 4/2009 | Zasypkin | |
| 2009/0155408 A1 | 6/2009 | Dupuy-cornuaille et al. | |
| 2009/0169701 A1 | 7/2009 | Pfeiffer | |
| 2009/0196957 A1 | 8/2009 | Vadlamani et al. | |
| 2010/0047391 A1 | 2/2010 | Meijer et al. | |
| 2010/0047398 A1 | 2/2010 | Vasquez | |
| 2010/0075017 A1 | 3/2010 | Nishimura et al. | |
| 2010/0227023 A1 | 9/2010 | Wassergord et al. | |
| 2010/0239740 A1 | 9/2010 | Meyer | |
| 2010/0303853 A1 | 12/2010 | Lejeune et al. | |
| 2011/0052785 A1 | 3/2011 | Zueniga | |
| 2011/0236543 A1 | 9/2011 | Chigurupati | |
| 2011/0244103 A1 | 10/2011 | Chigurupati | |
| 2012/0003358 A1 | 1/2012 | Vadlamani et al. | |
| 2012/0128830 A1 | 5/2012 | Chigurupati | |
| 2012/0164287 A1 | 6/2012 | Lundberg | |
| 2012/0201945 A1 | 8/2012 | Iwahata et al. | |
| 2012/0232166 A1 | 9/2012 | Finley et al. | |
| 2013/0196001 A1 | 8/2013 | Moore et al. | |
| 2013/0196049 A1 | 8/2013 | Brown et al. | |
| 2013/0224361 A1 | 8/2013 | Miyazawa et al. | |

(56) References Cited

U.S. PATENT DOCUMENTS

| | | | |
|---|---|---|---|
| 2013/0243924 | A1 | 9/2013 | Bhandari et al. |
| 2014/0044846 | A1 | 2/2014 | Grossbier et al. |
| 2014/0199462 | A1 | 7/2014 | Grossbier et al. |
| 2014/0234525 | A1 | 8/2014 | Berglund et al. |
| 2014/0255589 | A1 | 9/2014 | Osterwalder et al. |
| 2014/0314943 | A1 | 10/2014 | Adden |
| 2014/0328991 | A1 | 11/2014 | Kobayashi et al. |
| 2014/0377381 | A1 | 12/2014 | Brennan et al. |
| 2015/0017285 | A1 | 1/2015 | Stachiw et al. |
| 2015/0056338 | A1 | 2/2015 | Chigurupati et al. |
| 2015/0110926 | A1 | 4/2015 | Joly et al. |
| 2015/0125589 | A1 | 5/2015 | Tsuchiya et al. |
| 2015/0191361 | A1* | 7/2015 | Spijkman ............ C01D 3/06 423/499.4 |
| 2017/0035087 | A1 | 2/2017 | Chigurupati |

FOREIGN PATENT DOCUMENTS

| | | |
|---|---|---|
| CN | 1559436 | 1/2005 |
| DE | 3418644 | 11/1985 |
| DE | 9302125 | 4/1993 |
| EP | 0441786 | 10/1951 |
| EP | 0059363 | 9/1982 |
| EP | 0124254 | 11/1984 |
| EP | 0130822 | 9/1987 |
| EP | 0183736 | 7/1990 |
| EP | 0417062 | 3/1991 |
| EP | 0536612 | 7/1995 |
| EP | 0766927 | 4/1997 |
| EP | 0809942 | 12/1997 |
| EP | 1022252 | 7/2000 |
| EP | 1051086 | 4/2002 |
| EP | 0919137 | 9/2003 |
| EP | 1933645 | 6/2008 |
| EP | 2086354 | 8/2009 |
| EP | 2119372 | 11/2009 |
| EP | 2007226 B1 | 7/2010 |
| EP | 2247197 B1 | 11/2012 |
| EP | 2601846 | 6/2013 |
| ES | 2302546 | 7/2008 |
| FR | 2196151 | 10/1975 |
| FR | 2973989 | 10/2012 |
| FR | 3012293 | 5/2015 |
| GB | 312088 | 5/1930 |
| GB | 713803 | 8/1954 |
| GB | 911130 | 11/1962 |
| GB | 2237720 | 12/1993 |
| GB | 2396793 | 7/2004 |
| IL | 45392 | 7/1977 |
| JP | 57186460 | 11/1982 |
| JP | 62166862 | 10/1987 |
| JP | 2004052449 | 2/2004 |
| JP | 2008289426 | 12/2008 |
| JP | 2009507517 | 2/2009 |
| KR | 20070082418 | 8/2007 |
| KR | 20090105762 | 10/2009 |
| RU | 2414149 | 3/2011 |
| SU | 1375237 | 2/1998 |
| WO | WO198300081 | 1/1983 |
| WO | WO9216117 | 10/1992 |
| WO | WO9518546 | 7/1995 |
| WO | WO9617521 | 6/1996 |
| WO | WO9723593 | 7/1997 |
| WO | WO9802051 | 1/1998 |
| WO | WO9918811 | 4/1999 |
| WO | WO9940798 | 8/1999 |
| WO | WO2003053163 | 7/2003 |
| WO | WO2005086566 | 9/2005 |
| WO | WO2005094615 | 10/2005 |
| WO | WO2007032941 | 3/2007 |
| WO | WO2007132123 | 11/2007 |
| WO | WO2008043054 | 4/2008 |
| WO | WO2008096040 | 8/2008 |
| WO | WO2009047654 | 4/2009 |
| WO | WO2009116050 | 9/2009 |
| WO | WO2010119282 | 10/2010 |
| WO | WO2012067673 | 5/2012 |
| WO | WO2012093929 | 7/2012 |
| WO | WO2013085858 | 6/2013 |
| WO | WO2014071394 | 5/2014 |
| WO | WO2014127003 | 8/2014 |
| WO | WO2014172483 | 10/2014 |

OTHER PUBLICATIONS

Akethoom, CA 114 7653, Derwent Abstract, 1983, 8 pages.
Barbara Katz & Lu Ann Williams, Salt Reduction Gains Momentum, Food Technology, May 2010,25-32, United States.
Christopher M. Parry & Johannes Le Coutre, Monkeying Around With Taste, FoodScienceCentral.com, May 5, 2005, United States.
Fidel Toldra & Jose M. Barat, Recent Patents for Sodium Reduction in Foods, Jul. 25, 2008, vol. 1, No. 1, Bentham Science Publishers Ltd., United States.
Jacqueline B. Marcus, R.D., Culinary Applications of Umami, Food Technology, May 2005, p. 24-29, vol. 59, No. 5.
Kikuchi et al. Japanese Patent Application H05-1 03618 1993 Derwent Abstract, 2 pages.
Lawless, H.T., "The taste of calcium chloride in mixtures with NaCl, sucrose and citric acid," Food Quality and Preference [online], vol. 15, 2003, pp. 83-89.
Mary Ellen Kuhn, Strategies for Reducing Sodium in the U.S., Food Technology, May 2010,34-36, United States.
Nathan Gray, Taste Receptors Understanding May Hold Key for Low-Cal Sweeteners: Review, Food Navigator. Com, Mar. 3, 2011, United States.
'Rosemary Extract', Archive.org dated Sep. 28, 2004, 1 page.
Thomas Hofmann, Chi-Tang Ho & Wilhelm Pickenhagen, Challenges in Taste Research Present Knowledge and Future Implications, American Chemical Society 2004, Nov. 11, 2003, 24 pages.
Understandingfoodadditives.org, "Anti-Caking Agents", archive.org, Aug. 25, 2006, 2 pages.
International Search Report and Written Opinion of the International Searching Authority issued in International Application No. PCT/US2018/037857 dated Sep. 10, 2018; 16 pages.

* cited by examiner

LOW SODIUM SALT SUBSTITUTE WITH POTASSIUM CHLORIDE

CROSS-REFERENCE TO RELATED APPLICATIONS

This application is a U.S. National Stage of PCT/US2018/037857 filed on Jun. 15, 2018, which claims priority to U.S. Patent Application No. 62/560,117 entitled "LOW SODIUM SALT SUBSTITUTE WITH POTASSIUM CHLORIDE" and filed on Sep. 18, 2017, which are incorporated herein by reference in their entirety.

TECHNICAL FIELD

The present disclosure is related to a low sodium salt substitute with potassium chloride.

BACKGROUND

Salt, or sodium chloride (NaCl), is well known. While salt imparts a desirable flavor to food, too much use can result in long term adverse health risks. Because of the proliferation of salt in prepared foods and other products found in grocery stores, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

The most recent Dietary Guidelines issued in the U.S. suggest a proposed consumption limit of 2300 mg of sodium per day, and the American Heart Association even suggests a more stringent limit of 1500 mg of sodium per day. The Institute of Medicine also recommends a potassium consumption limit of 4,700 mg per day. Typically, potassium consumption is less than half of that level.

Because of these and other reasons, there are a variety of salt substitutes on the market. One approach to production of salt substitutes involves combining sodium and potassium salts, or occasionally magnesium salts, in various ratios and adding a wide variety of other additives to this mix. The other additives are typically added to mask or at least partially reduce the metallic or bitter taste of potassium that has been associated with salt substitutes containing potassium. However, off flavors in salt substitutes have limited their widespread acceptance.

SUMMARY

In a first general aspect, a salt substitute precursor includes a mixture of water, potassium chloride, a food grade acid, and an anticaking agent. A pH of the salt substitute precursor is between 2 and 4, and the salt substitute precursor is a saturated or supersaturated solution, a suspension, or a slurry.

Implementations of the first general aspect may include one or more of the following features.

The food grade acid may be citric acid. The anticaking agent may include at least one of sodium aluminosilicate, sodium ferrocyanide, potassium ferrocyanide, calcium carbonate, magnesium carbonate, tricalcium phosphate, and silicon dioxide. The mixture may include sodium chloride. In some cases, the salt substitute precursor is a homogeneous solution. A pH of the salt substitute precursor is typically in a range between 3 and 4. The salt substitute precursor may include less than 80 wt % water, less than 70 wt % water, less than 65 wt % water, or less than 60 wt % water.

In a second general aspect, a salt substitute includes potassium chloride or solvated portions thereof, citric acid or solvated portions thereof, and an anticaking agent or solvated portions thereof. The salt substitute includes at least 1 wt % citric acid.

Implementations of the second general aspect may include one or more of the following features.

The salt substitute may include at least 96 wt %, at least 97 wt %, at least 98 wt %, or less than 99 wt % potassium chloride. The salt substitute may include 0.1 wt % to 2 wt % of the anticaking agent. The salt substitute may include 0.1 wt % to 5 wt % citric acid. The salt substitute may include sodium chloride. An aqueous solution formed by dissolving the salt substitute in water having a pH of 7 yields a solution having a pH between 4 and 5.

In a third general aspect, making a salt substitute includes forming a salt substitute precursor including a mixture of water, potassium chloride, a food grade acid, and an anticaking agent. A pH of the salt substitute precursor is between 2 and 4, the salt substitute precursor is a saturated or supersaturated solution, a suspension, or a slurry, and a temperature of the salt substitute precursor is less than 240° F. The third general aspect further includes providing the salt substitute precursor to a centrifuge, and centrifuging the salt substitute precursor to yield a salt substitute in the form of a solid and a centrate.

Implementations of the third general aspect may include one or more of the following features.

The salt substitute may be a homogeneous composition. The salt substitute may include less than 5 wt % water. Some implementations include washing the salt substitute with the centrate and drying the salt substitute to yield a dried salt substitute, wherein the dried salt substitute comprises less than 1.5 wt % water.

In a fourth general aspect, a salt substitute precursor includes water, a chloride salt, a food grade acid, and an anticaking agent. The chloride salt includes potassium chloride. A pH of the salt substitute precursor is between 2 and 4, and the salt substitute precursor is a saturated or supersaturated solution, a suspension, or a slurry.

Implementations of the fourth general aspect may include one or more of the following features.

The food grade acid may include at least one of acetic acid, ascorbic acid, benzoic acid, citric acid, fumaric acid, lactic acid, malic acid, tartaric acid, lemon juice, hydrochloric acid, and phosphoric acid. The anticaking agent may include at least one of sodium aluminosilicate, sodium ferrocyanide, potassium ferrocyanide, calcium carbonate, magnesium carbonate, tricalcium phosphate, and silicon dioxide. The chloride salt may further include sodium chloride.

The salt substitute precursor is typically free of a carrier. A pH of the salt substitute precursor is typically between 3 and 4. In some cases, the salt substitute precursor is a homogeneous solution. Water may comprise less than 80 wt %, less than 70 wt %, less than 50 wt %, or less than 25 wt % of the salt substitute precursor.

In a fifth general aspect, a salt substitute includes a chloride salt, a food grade acid, and an anticaking agent. The salt substitute includes potassium chloride, and is in the form of a crystalline solid including at least 95 wt % of the chloride salt, up to 1 wt % of the food grade acid, and up to 1 wt % of the anticaking agent.

Implementations of the fifth general aspect may include one or more of the following features.

In one implementation, the salt substitute includes at least 98 wt % of the chloride salt, up to 1 wt % of the food grade acid, and up to 1 wt % of the anticaking agent. In one implementation, the salt substitute includes at least 99 wt % of the chloride salt, up to 0.1 wt % of the food grade acid; and up to 0.1 wt % of the anticaking agent.

In some cases, the chloride salt includes at least 99 wt % potassium chloride. In certain cases, the chloride salt further includes sodium chloride, and the salt substitute is in the form of a particulate combined crystalline solid, where each particle of the combined crystalline solid includes a region consisting essentially of potassium chloride in direct contact with a region consisting essentially of sodium chloride. In some cases, the chloride salt includes 1 wt % to 90 wt % sodium chloride and 10 wt % to 99 wt % potassium chloride.

The food grade acid may include at least one of acetic acid, ascorbic acid, benzoic acid, citric acid, fumaric acid, lactic acid, malic acid, tartaric acid, succinic acid, lemon juice, hydrochloric acid, and phosphoric acid. In some cases, the salt substitute includes at least 0.01 wt % of the food grade acid (e.g., 0.01 wt % to 0.5 wt % of the food grade acid, or 0.01 wt % to 0.1 wt % of the food grade acid). The anticaking agent typically includes at least one of sodium aluminosilicate, sodium ferrocyanide, potassium ferrocyanide, calcium carbonate, magnesium carbonate, tricalcium phosphate, and silicon dioxide. The salt substitute may include at least 0.001 wt % or at least 0.01 wt % of the anticaking agent. An aqueous solution formed by dissolving the salt substitute in water having a pH of 7 yields a solution having a pH between 4 and 5. The salt substitute is substantially free of a metallic taste.

In a sixth general aspect, making a salt substitute includes forming a salt substitute precursor, providing the salt substitute precursor to a centrifuge, and centrifuging the salt substitute precursor to yield a salt substitute in the form of a solid and a centrate. The salt substitute precursor includes a mixture of water, a chloride salt, a food grade acid, and an anticaking agent. The chloride salt includes potassium chloride. The salt substitute precursor is a saturated or supersaturated solution, a suspension, or a slurry, and a pH of the salt substitute precursor is between 2 and 5.

Implementations of the sixth general aspect may include one or more of the following features.

The salt substitute may be washed with the centrate. The chloride salt may further include sodium chloride. The salt substitute is typically in the form of a combined crystalline solid including particles, wherein each particle of the combined crystalline solid includes a region consisting essentially of potassium chloride in direct contact with a region consisting essentially of sodium chloride. A temperature of the salt substitute precursor provided to the centrifuge is typically less than 240° F. A pH of the salt substitute precursor is typically between 2 and 4.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
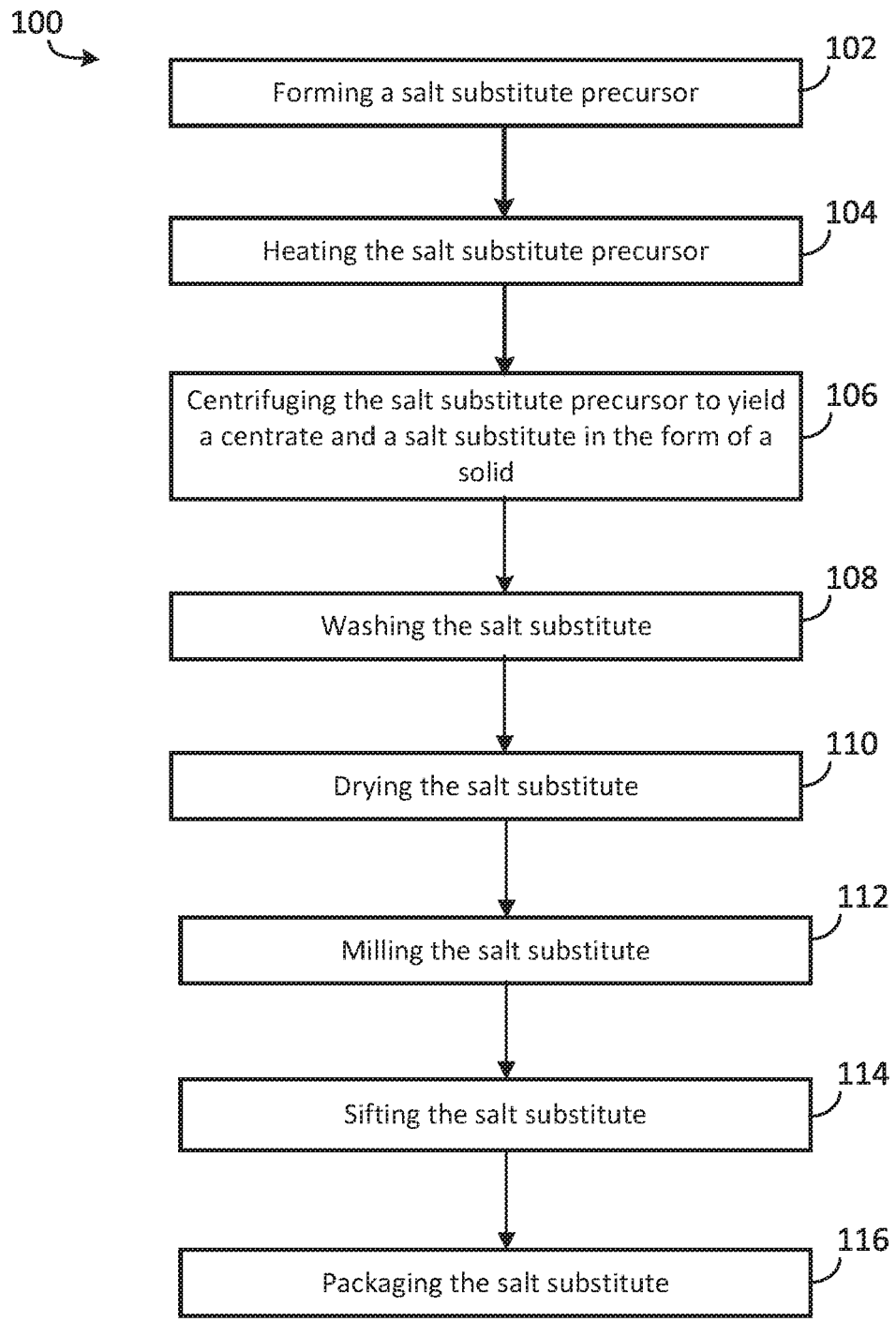
FIG. 1 is a flowchart showing a process for preparing a salt substitute with potassium.

FIG. 1 shows process 100 for preparing a salt substitute with potassium.

In 102, a salt substitute precursor is formed. The salt substitute precursor includes water, a chloride salt, a food grade acid, and an anticaking agent. The chloride salt includes potassium chloride, and may also include sodium chloride. The salt substitute precursor may be formed by combining components including water, a chloride salt, a food grade acid, and an anticaking agent. Suitable food grade acids include organic acids and mineral acids. Examples of suitable organic food grade acids include acetic acid, ascorbic acid, benzoic acid, citric acid, fumaric acid, lactic acid, succinic acid, malic acid, tartaric acid, and compositions such as lemon juice that include one or more organic acids. Examples of suitable mineral acids include hydrochloric acid and phosphoric acid. Suitable anticaking agents include sodium aluminosilicate, sodium ferrocyanide, potassium ferrocyanide, calcium carbonate, magnesium carbonate, tricalcium carbonate, and silicon dioxide. In some embodiments, the salt substitute precursor consists of or consists essentially of a mixture of water, potassium chloride, a food grade acid, and an anticaking agent. As used herein, the phrase "consists essentially of" generally refers to a composition that includes at least 99 wt % of the components that follow the phrase. In one example, for a salt substitute precursor that consists essentially of a mixture of water, potassium chloride, a food grade acid, and an anticaking agent, these components make up at least 99 wt % of the salt substitute precursor. In some cases, the salt substitute precursor includes sodium, and the salt substitute precursor is formed by combining sodium chloride with other salt substitute precursor components. In some embodiments, the salt substitute precursor consists of or consists essentially of a mixture of water, potassium chloride, sodium chloride, a food grade acid, and an anticaking agent. In some embodiments, the salt substitute precursor is free or substantially free of a carrier. As used here, "carrier" generally refers cereal flours or starches (such as wheat flour and rice flour), fruit flour or starches (such as banana flour), root flours or starches (such as potato flour and tapioca flour), monosaccharides, disaccharides, oligosaccharides, polysaccharides (such as maltodextrin), and natural and artificial sweeteners (such as honey, cane sugar, beet sugar, and Stevia), and "substantially free" of a carrier refers to 1 wt % or less of a carrier. The salt substitute precursor may include one or more additional components, such as one or more mineral salts. Examples of suitable mineral salts include magnesium chloride and calcium chloride.

Forming the salt substitute precursor includes mixing the components of the salt substitute precursor to yield a homogenous solution or a mixture including suspended solids. Mixing the components of the salt substitute precursor may occur at any temperature above a freezing point and below a boiling point of the salt substitute precursor. In some cases, mixing the components of the salt substitute precursor occurs at a temperature between ambient temperature and 240° F. In some examples, mixing the components of the salt substitute precursor occurs at a temperature between 20° F. and 240° F., between 80° F. and 180° F., or between 100° F. and 160° F.

Forming the salt substitute precursor typically includes heating the components of the salt substitute precursor. The salt substitute precursor may be heated to a boiling temperature of the salt substitute precursor. In some cases, the salt substitute precursor is heated to a temperature of at least 50° F. or at least 120° F. In certain cases, the salt substitute precursor is heated to a temperature of at least 140° F., at least 160° F., or at least 240° F. The salt substitute precursor may be heated to a temperature suitable to achieve a total dissolved and suspended solids content of 25 wt % to 50 wt %, 20 wt % to 80 wt %, 40 wt % to 80 wt %, or 45 wt % to 75 wt % total solids.

Mixing the salt substitute precursor, heating the salt substitute precursor, or mixing and heating the salt substitute precursor typically occurs for a length of time sufficient to form a homogenous solution, a suspension, or a slurry. In some cases, the salt substitute precursor is heated and mixed for a length of time in a range between 1 and 100 minutes, between 10 and 90 minutes, between 15 minutes and 80 minutes, between 20 minutes or 40 minutes, or between 20 minutes and 60 minutes.

The salt substitute precursor may include 0.1 wt % to 5 wt %, 0.1 wt % to 4 wt %, 0.1 wt % to 3 wt %, 0.1 wt % to 2 wt %, or 0.1 wt % to 1 wt % food grade acid. In some cases, the salt substitute precursor includes 0.1 wt % to 5 wt %, 0.1 wt % to 4 wt %, 0.1 wt % to 3 wt %, 0.1 wt % to 2 wt %, or 0.1 wt % to 1 wt % anticaking agent.

A pH of the salt substitute precursor may be less than 7, less than 6, less than 5, or less than 4. In some cases, a pH of the salt substitute precursor is between 2 and 4, between 2 and 5, between 3 and 6, between 4 and 6, between 3 and 5, between 3.5 and 5.5, between 3 and 4, or between 4 and 5. The salt substitute precursor may be a homogeneous solution, or may include suspended solids. In some cases, the salt substitute precursor is a saturated or supersaturated solution. In one example, the solids content of the salt substitute precursor exceeds the saturation point by at least 10 wt %. The salt substitute precursor may include 20 wt % to 80 wt %, 40 wt % to 80 wt %, or 45 wt % to 75 wt % total solids. In one example, the salt substitute precursor includes 30 to 45 wt % total solids. The salt substitute precursor typically includes less than 80 wt % water. In some examples, the salt substitute precursor includes less than 75 wt %, less than 70 wt %, less than 65 wt %, or less than 60 wt % water. In some examples, the salt substitute precursor includes 5 wt % to 25 wt % water.

For a salt substitute precursor including, consisting of, or consisting essentially of a mixture of water, potassium chloride, a food grade acid, and an anticaking agent, suitable amounts of these components include 20 wt % to 75 wt % water, 20 wt % to 75 wt % potassium chloride, 0.1 wt % to 5 wt % food grade acid, and 0.1 wt % to 5 wt % anticaking agent. However, embodiments include all combinations of various component ranges disclosed herein.

For a salt substitute precursor including, consisting of, or consisting essentially of a mixture of water, potassium chloride, sodium chloride, a food grade acid, and an anticaking agent, suitable amounts of these components include 20 wt % to 95 wt % water, 2 wt % to 75 wt % potassium chloride, 2 wt % to 75 wt % sodium chloride, 0.1 wt % to 5 wt % food grade acid, and 0.1 wt % to 5 wt % anticaking agent. However, embodiments include all combinations of various component ranges disclosed herein.

In 104, the salt substitute precursor from 102 is heated. In 106, the salt substitute precursor is centrifuged to yield a centrate and a salt substitute in the form of a solid. The salt substitute precursor may be provided to the centrifuge continuously or intermittently via a conduit. A temperature of the salt substitute precursor provided to the centrifuge is typically above 20° F. and up to 240° F. In some cases, the salt substitute precursor is at ambient temperature before centrifuging. Suitable centrifuges include but are not limited to pusher centrifuges, disc stack centrifuges, decanter centrifuges, and basket centrifuges. The salt substitute may be in the form of a solid cake or in particulate form. The salt substitute typically includes at least 90 wt % total solids or at least 99 wt % total solids. In some cases, the salt substitute includes 90 wt % to 95 wt % total solids. A water content of the salt substitute is typically less than 10 wt %, less than 5 wt %, or less than 2 wt %. Thus, the salt substitute with less than 10 wt %, less than 5 wt %, or less than 2 wt % water can be prepared from the salt substitute precursor without the addition of heat to remove the water.

The centrate from 106 typically has a solids content between 20 wt % and 50 wt %, or between 30 wt % and 40 wt %. A pH of the centrate is typically in a range between 2 and 4 or between 2 and 5, for example, between 2 and 3, or between 3 and 4.

In 108, the salt substitute is washed. Washing the salt substitute typically includes contacting the salt substitute with a wash liquid including water, with or without one or more other solvents. The wash liquid may include one or more additives. In some embodiments, the wash liquid includes a food grade acid, such as citric acid. In one example, the centrate is collected and used as the wash liquid. When the centrate is used as the wash liquid, salt substitute precursor components remaining in the centrate may be added to the salt substitute, thereby increasing recovery of the components in the salt substitute precursor. The salt substitute formed during 106 may be washed while the salt substitute is being formed. That is, 106 and 108 may occur at the same time.

In 110, the salt substitute is dried to yield a dry salt substitute. Drying the salt substitute may include heating the salt substitute to reduce a water content of the salt substitute to less than 5 wt %, less than 4 wt %, less than 3 wt %, less than 2 wt %, or less than 1 wt %. Examples of suitable dryers include fluid bed dryers, rotary dryers, flash dryers, belt dryers, microwave dryers, and tray dryers.

In 112, the salt substitute is milled. Milling may include forming particles or reducing a particle size of the salt substitute.

In 114, the salt substitute is sifted.

In 116, the salt substitute is packaged.

The salt substitute is in crystalline form. The salt substitute includes, consists of, or consists essentially of a chloride salt, a food grade acid, and an anticaking agent. In some cases, the salt substitute may be a chemically homogeneous composition that includes, consists of, or consists essentially of potassium chloride or ionic components thereof (e.g., potassium ions and chloride ions), citric acid or ionic components thereof (e.g., citrate and hydrogen ions), and an anticaking agent or ionic components thereof (e.g., anions, cations, conjugate acids, or conjugate bases of the anticaking agent). In some cases, the salt substitute includes, consists of, or consists essentially of potassium chloride or ionic components thereof, sodium chloride or ionic components thereof (e.g., sodium ions and chloride ions), citric acid or ionic components thereof, and an anticaking agent or ionic components thereof. For salt substitutes including potassium chloride and sodium chloride, the salt substitute is typically a combined crystalline solid in the form of particles, where each particle includes a region consisting of or consisting essentially of potassium chloride in direct contact with a region consisting of or consisting essentially of sodium chloride.

As used herein with respect to content in a salt substitute precursor or salt substitute, a component is understood to include its ionic and nonionic forms. As used herein, "potassium chloride" is understood to include any combination of potassium chloride, potassium ions, and chloride ions); "citric acid" is understood to include any combination of citric acid and its conjugate base(s) (e.g., citrate) and hydrogen or hydronium ions; "sodium chloride" is understood to include any combination of sodium chloride, sodium ions, and chloride ions); and "anticaking agent" is understood to include any combination of the anticaking agent, and its nonionic and ionic forms, including its conjugate acid(s), base(s), or both.

In some embodiments, the salt substitute includes at least 1 wt % citric acid. In one example, the salt substitute includes 0.8 wt % to 5 wt % citric acid. In some examples, the salt substitute includes 0.01 wt % to 2 wt %, 0.01 wt % to 1 wt %, 0.01 wt % to 0.5 wt %, 0.01 wt % to 0.4 wt %, 0.01 wt % to 0.3 wt %, 0.01 wt % to 0.2 wt %, or 0.01 wt % to 0.1 wt % citric acid. In some examples, the salt substitute includes at least 96 wt %, at least 98 wt %, or at least 99 wt % potassium chloride. The salt substitute may include 0.1 wt % to 1 wt %, 0.1 wt % to 2 wt %, 0.1 wt % to 3 wt %, 0.1 wt % to 4 wt %, or 0.1 wt % to 5 wt % of the anticaking agent.

In some cases, the salt substitute includes, consists of, or consists essentially of potassium chloride, food grade acid, an anticaking agent, and sodium chloride. The salt substitute typically includes up to 1 wt % or up to 0.1 wt % food grade acid. As used herein, "up to" refers to "up to and including." In one example, "up to 0.1 wt %" includes values of 0.1 wt % and less. The salt substitute can include up to 0.1 wt %, up to 0.2 wt %, up to 0.3 wt %, up to 0.4 wt %, up to 0.5 wt %, up to 1 wt %, or up to 2 wt % food grade acid. In some cases, an amount of food grade acid in the salt substitute is 10% or less or 5% or less of the food grade acid in the salt substitute precursor. The chloride salt may include 10 wt % to 99 wt % potassium chloride and 1 wt % to 90 wt % sodium chloride, or 20 wt % to 99 wt % potassium chloride and 0 wt % to 80 wt % sodium chloride. The salt substitute may include 0.1 wt % to 5 wt % of the anticaking agent. The salt substitute typically has a particle size in a range of 25 μm to 1000 μm. The particle size can be adjusted by altering processing conditions or milling the salt substitute to achieve a size desired for an intended application. A density of the salt substitute is typically in a range between 58 pounds/cubic foot (0.8 grams/cubic centimeter) and 72 pounds/cubic foot (1.2 grams/cubic centimeter).

The salt substitute, when dissolved in water having a pH of 7, typically yields a solution having a pH between 2 and 5, between 3 and 5, or between 4 and 5.

In some cases, one or more of the operations in FIG. 1 may be omitted. That is, one or more of the operations in FIG. 1 may be optional. In some examples, 110, 112, 114, or any combination thereof may be omitted. In certain cases, one or more of the operations depicted in FIG. 1 is replaced or combined with another operation, the order of one or more the operations is interchanged, two or more operations occur simultaneously or continuously, an additional operation is added, or any combination thereof.

The salt substitute described herein may be used as a substitute for salt (i.e., sodium chloride), or in addition to or blended with sodium chloride. The salt substitute is advantageously substantially free of a metallic taste. The salt substitute described herein may be used in a variety of applications as table salt, inclusion in processed foods such as snack foods, baked goods, to season meats and poultries, and for other food items that have included salt.

EXAMPLES

Example 1

In this example, 121 gallons of water was added to a batching tank. The water was 180.0° F. when added. 500 pounds of potassium chloride was added to the water to yield a slurry. 2.5 pounds of magnesium carbonate was added to the slurry. 8.0 pounds of citric acid was added to the slurry. The pH was tested to be 3.79. The slurry was held for 1 hour, during which time the temperature fell to between 110° F. and 120° F. After 1 hour hold time, 500 pounds of sodium chloride was added to the slurry, and the pH was retested and found to be 3.40. The slurry was 51.30 wt % solids. The slurry was then provided to a pusher centrifuge (BP Littleford, Model S-200 Centrifuge) and dried.

Figure 2A:
FIGS. 2A and 2B show energy dispersive X-ray spectroscopy (EDS) and scanning electron microscopy (SEM) images, respectively, of the salt substitute prepared as described in Example 1.
Figure 2B:
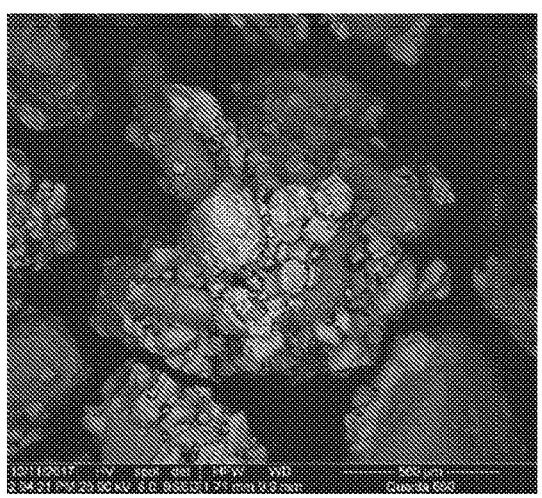

FIGS. 2A and 2B show energy dispersive X-ray spectroscopy (EDS) and scanning electron microscopy (SEM) images, respectively, of the salt substitute of Example 1. The salt substitute is in the form of a combined crystalline solid comprising particles. In FIG. 2A, portions of particles correspond to potassium, and portions of particles correspond to sodium. Thus, particles include regions consisting essentially of potassium chloride and regions consisting essentially of sodium chloride, with said regions in direct contact. The scale bars in FIGS. 2A and 2B are 100 μm and 500 μm, respectively. The magnification in FIG. 2B is 150×.

Example 2

In this example, 121 gallons of water was added to a batching tank. The water was 177.4° F. when added. 500 pounds of potassium chloride, which included 0.005 wt % or 2.5 pounds of magnesium carbonate, was added to the water to yield a slurry. 8.0 pounds of citric acid was added to the slurry. The pH was tested to be 2.98. The slurry was held for 1 hour, during which time the temperature fell to 118° F. After 1 hour hold time, 500 pounds of sodium chloride was added to the slurry, and the pH was retested and found to be 2.64. The slurry was 53.78 wt % solids. The slurry was then provided to a pusher centrifuge (BP Littleford, Model S-200 Centrifuge) and dried.

Figure 3A:
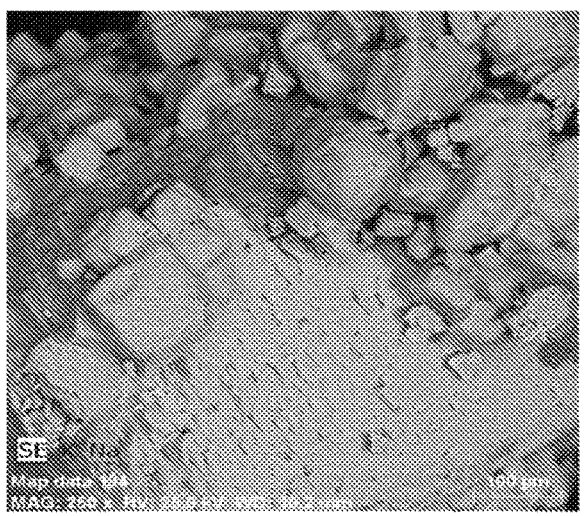
FIGS. 3A and 3B show EDS and SEM images, respectively, of the salt substitute prepared as described in Example 2.
Figure 3B:
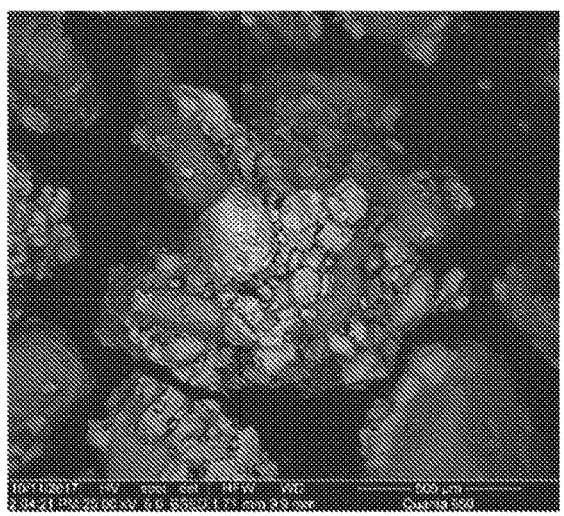

FIGS. 3A and 3B show EDS and SEM images, respectively, of the salt substitute of Example 2. The salt substitute is in the form of a combined crystalline solid comprising particles. In FIG. 3A, portions of particles correspond to potassium, and portions of particles correspond to sodium. Thus, particles include regions consisting essentially of potassium chloride and regions consisting essentially of sodium chloride, with said regions in direct contact. The scale bars in FIGS. 3A and 3B are 100 μm and 500 μm, respectively. The magnification in FIG. 3B is 150×.

Example 3

In this example, 665 lbs of potassium chloride, 3.325 lbs of magnesium carbonate, and 6.65 lbs of citric acid were mixed in 766 lbs of water and blended at 120° F. to yield a slurry. The slurry contained 46.8% solids, and the pH was 3.25. The slurry was held in suspension by tank agitation. The slurry was fed to a pusher centrifuge at 216.2 lb/min, and a solid cake was created at 52.2 lb/min and 2.5 wt % moisture. The cake was further dried in an infrared oven to reduce the moisture content to less than 1 wt %. The salt substitute was sampled for taste, and reflected a clean profile with little to no metallic aftertaste.

Example 4

In this example, 325 lbs of potassium chloride, 325 lbs of sodium chloride, 3.25 lbs of magnesium carbonate, and 6.5 lbs of citric acid were mixed in 766 lbs of water and blended at 120° F. The slurry contained 46.3 wt % solids, and the pH was 3.2. The slurry was held in suspension by tank agitation. The slurry feed rate to the pusher centrifuge was 171.2 lb/min, and a solid cake was created at 49 lb/min at 2.89% moisture. The cake was further dried in an infrared oven to reduce the moisture content to less than 1 wt %. The salt substitute was sampled for taste, and reflected a clean profile with little to no metallic aftertaste.

Table 1A lists components used to prepare Salt Substitutes A-O, as well as properties of the salt substitute precursor, the salt substitute, and the centrate. Examples 1 and 2 correspond to Tests D and E, respectively, in Table 1. Table 1B lists components used to prepare Salt Substitutes P-U, as well as properties of the salt substitute precursor, the salt substitute, and the centrate. The procedure used to prepare Salt Substitutes A-U generally corresponds to procedures described in Examples 1-4. For Salt Substitutes A-O, the salt substitute precursor was held for 1 hour between 105° F. and 125° F. before centrifugation. Salt Substitutes L1-L3 differed by the temperature of the slurry provided to the centrifuge, with temperatures of 75° F., 85° F. and 95° F., respectively. Salt Substitutes P1-P9 differed by the length of the hold time in the slurry before centrifugation. The amount of citric acid (i.e., citric acid plus citrate) in Salt Substitutes N, O, and S was measured three times, with the average result being 400 ppm by weight (0.04 wt %), 1003 ppm by weight (0.10 wt %), and 684 ppm (0.07 wt %), respectively.

TABLE 1A

Salt Substitutes A-O.

| Test | Water (Gallons) | KCl (lbs) | NaCl (lbs) | Citric (lbs) | MgCO3 (lbs) | Salt Substitute Precursor Solids (wt %) | Salt Substitute Precursor pH | Salt Substitute Moisture (wt %) | Salt Substitute pH | Centrate Solids (wt %) | Centrate pH |
|---|---|---|---|---|---|---|---|---|---|---|---|
| A | 124.00 | 746.25 | | 6.00 | 3.75 | 44.85 | 4.36 | 3.82 | 4.41 | | |
| B | 124.00 | 400.00 | 400.00 | 9.00 | 4.00 | 41.77 | 3.52 | 4.00 | 4.59 | 36.91 | |
| C | 124.00 | 400.00 | 400.00 | 8.00 | 4.00 | 42.00 | 3.25 | 3.25 | 4.14 | | 3.20 |
| D | 121.00 | 500.00 | 500.00 | 8.00 | 2.50 | 51.30 | 3.40 | 2.44 | 4.36 | 34.96 | 3.39 |
| E | 121.00 | 497.50 | 500.00 | 8.00 | 2.50 | 53.78 | 2.64 | 3.62 | 3.80 | 34.60 | 2.51 |
| F | 121.00 | 1492.50 | 1500.00 | 15.00 | 7.50 | 76.98 | 3.10 | 5.54 | 4.02 | 36.04 | 3.13 |
| G | 121.00 | 497.50 | 500.00 | 7.50 | 2.50 | 49.35 | 2.59 | 2.52 | 3.72 | 44.68 | 2.48 |
| H | 121.00 | 1492.50 | 1500.00 | 15.50 | 7.50 | 74.77 | 2.65 | 3.79 | 3.60 | 34.52 | 2.63 |
| I | 121.00 | 2985.00 | | 30.00 | 15.00 | 72.10 | 3.00 | | | 36.05 | |
| J | 121.10 | 2985.00 | | 25.00 | 28.00 | 67.13 | 3.60 | | | | |
| K | 121.00 | 750.00 | 750.00 | 25.00 | 7.50 | | | | | | |
| L1 (75° F.) | 60.00 | 746.25 | 750.00 | 6.00 | 3.75 | | | 3.94 | 3.79 | 34.44 | 2.80 |
| L2 (85° F.) | 60.00 | 746.25 | 750.00 | 6.00 | 3.75 | | | 3.06 | 3.82 | 36.74 | 2.82 |
| L3 (95° F.) | 60.00 | 746.25 | 750.00 | 6.00 | 3.75 | 75.94 | 2.83 | 3.81 | 2.83 | 36.75 | 2.80 |
| M | 121.00 | 2985.00 | | 22.00 | 15.00 | 71.45 | 3.39 | 2.43 | 3.91 | | |
| N | 60.00 | 497.50 | 950.00 | 6.00 | 2.50 | 74.57 | 3.30 | 3.20 | 4.05 | | |
| O | 91.00 | 1990.00 | 250.00 | 17.00 | 10.00 | 70.62 | 3.20 | 3.25 | 4.28 | | |

TABLE 1B

Salt Substitute Tests P-U.

| Test | Water (Gallons) | KCl (lbs) | NaCl (lbs) | Citric (lbs) | MgCO3 (lbs) | Salt Substitute Precursor Solids (wt %) | Salt Substitute Precursor pH | Salt Substitute Moisture (wt %) | Salt Substitute pH | Centrate Solids (wt %) | Centrate pH | Hold Time (min) | KCl/NaCl Wt. Ratio |
|---|---|---|---|---|---|---|---|---|---|---|---|---|---|
| P1 | 60.00 | 1492.50 | | 22.00 | 7.50 | 72.12 | 3.32 | 3.11 | 4.70 | 31.80 | 3.84 | 0 | |
| P2 | 60.00 | 1492.50 | | 22.00 | 7.50 | 72.12 | 3.32 | 3.04 | 4.76 | 29.96 | 3.85 | 5 | |
| P3 | 60.00 | 1492.50 | | 22.00 | 7.50 | 72.12 | 3.32 | 2.78 | 4.69 | 31.16 | 3.87 | 10 | |
| P4 | 60.00 | 1492.50 | | 22.00 | 7.50 | 72.12 | 3.32 | 2.50 | 4.69 | 30.22 | 3.86 | 15 | |
| P5 | 60.00 | 1492.50 | | 22.00 | 7.50 | 72.12 | 3.32 | 3.19 | 4.68 | 31.76 | 3.88 | 20 | |
| P6 | 60.00 | 1492.50 | | 22.00 | 7.50 | 72.12 | 3.32 | 1.92 | 4.72 | 30.75 | 3.93 | 25 | |
| P7 | 60.00 | 1492.50 | | 22.00 | 7.50 | 72.12 | 3.32 | 3.93 | 4.68 | 32.03 | 3.87 | 30 | |
| P8 | 60.00 | 1492.50 | | 22.00 | 7.50 | 72.12 | 3.32 | 2.67 | 4.69 | 31.57 | 3.87 | 35 | |

TABLE 1B-continued

Salt Substitute Tests P-U.

| Test | Water (Gallons) | KCl (lbs) | NaCl (lbs) | Citric (lbs) | MgCO3 (lbs) | Salt Substitute Precursor Solids (wt %) | pH | Salt Substitute Moisture (wt %) | pH | Centrate Solids (wt %) | pH | Hold Time (min) | KCl/NaCl Wt. Ratio |
|---|---|---|---|---|---|---|---|---|---|---|---|---|---|
| P9 | 60.00 | 1492.50 | | 22.00 | 7.50 | 72.12 | 3.32 | 1.66 | 4.69 | 32.11 | 3.86 | 60 | |
| Q | 60.00 | 1417.88 | 75.00 | 18.00 | 7.50 | 70.61 | 3.28 | 3.28 | 4.34 | 36.00 | 3.50 | 30 | 95/5 |
| R | 60.00 | 1343.25 | 150.00 | 16.00 | 7.50 | 70.86 | 3.31 | 3.39 | 4.54 | 38.33 | 3.44 | 30 | 90/10 |
| S | 60.00 | 1119.38 | 375.00 | 14.00 | 7.42 | 72.63 | 3.12 | 2.28 | 4.01 | 35.68 | 3.08 | 30 | 75/25 |
| T | 60.00 | 522.38 | 975.00 | 14.00 | 7.42 | 75.21 | 3.32 | 2.88 | 4.43 | 37.41 | 3.30 | 30 | 35/65 |
| U | 60.00 | 1313.40 | 180.00 | 14.00 | 7.50 | 72.50 | 3.28 | 3.27 | 4.29 | 37.96 | 3.19 | 30 | 88/12 |

Table 2 lists RO-TAP test results (particle size distribution by weight in US20-US200 Mesh) for 100 grams of Salt Substitutes M and O. Table 3 lists RO-TAP test results (particle size distribution by weight in US20-US400 Mesh) for 100 grams of Salt Substitutes P-T.

TABLE 2

Particle size distribution for Salt Substitutes M and O.

| Test | US20 (g) | US30 (g) | US40 (g) | US60 (g) | US80 (g) | US100 (g) | US200 (g) | Pan (g) | Sum (g) |
|---|---|---|---|---|---|---|---|---|---|
| M | 0.00 | 1.80 | 9.00 | 38.40 | 25.70 | 9.00 | 14.20 | 1.60 | 99.70 |
| O | 0.10 | 6.20 | 12.50 | 35.70 | 21.80 | 8.40 | 14.20 | 1.30 | 100.20 |
| Average | 0.05 | 4.00 | 10.75 | 37.05 | 23.75 | 8.70 | 14.20 | 1.45 | 99.95 |

TABLE 3

Particle size distribution for Salt Substitutes P-T.

| Test | US20 (g) | US40 (g) | US60 (g) | US80 (g) | US100 (g) | US200 (g) | US400 (g) | Pan (g) |
|---|---|---|---|---|---|---|---|---|
| P1 | 0.5 | 2.5 | 6.6 | 9.7 | 8.1 | 63.8 | 8.4 | 0.8 |
| P2 | 0.6 | 3.8 | 7.0 | 8.9 | 7.6 | 59.8 | 11.5 | 1.0 |
| P3 | 0.6 | 2.5 | 6.9 | 9.9 | 8.2 | 50.4 | 17.2 | 4.4 |
| P4 | 3.8 | 5.4 | 9.9 | 14.6 | 11.3 | 47.3 | 8.0 | 0.9 |
| P5 | 3.1 | 6.0 | 11.1 | 13.4 | 9.6 | 38.5 | 16.2 | 1.2 |
| P6 | 0.5 | 3.3 | 11.1 | 13.9 | 10.1 | 37.1 | 20.9 | 2.9 |
| P7 | 3.8 | 3.0 | 8.0 | 13.1 | 11.0 | 42.7 | 14.8 | 4.4 |
| P8 | 0.6 | 1.3 | 10.1 | 16.9 | 12.9 | 44.3 | 11.3 | 2.6 |
| P9 | 1.2 | 1.8 | 6.7 | 14.1 | 10.9 | 53.9 | 9.7 | 1.7 |
| Q | 0.1 | 3.3 | 8.8 | 13.5 | 11.2 | 45.4 | 14.4 | 2.4 |
| R | 0.4 | 4.1 | 9.1 | 10.3 | 8.4 | 44.6 | 18.7 | 3.7 |
| S | 0.1 | 2.2 | 11.2 | 11.7 | 9.9 | 43.3 | 17.7 | 2.8 |
| T | 0.0 | 3.9 | 20.7 | 14.1 | 8.7 | 32.1 | 15.9 | 3.3 |

Table 4 lists average bulk density (tapped and untapped) for 100 g of Salt Substitutes P-T in g/cm³ and lb/ft³. The bulk density ranges from about 60 lb/ft³ to about 80 lb/ft³ (tapped and untapped) for these samples, which is similar to the reported ranges of various types of commercially available sodium chloride.

TABLE 4

Bulk density of Salt Substitutes P-T.

| Test | Average Volume (cm³) | Average Volume Tapped (cm³) | Bulk Density (g/cm³) | Bulk Density Tapped (g/cm³) | Bulk Density (lb/ft³) | Bulk Density Tapped (lb/ft³) |
|---|---|---|---|---|---|---|
| P1 | 108.67 | 80.67 | 0.92 | 1.24 | 59.29 | 79.87 |
| P2 | 110.33 | 81.00 | 0.91 | 1.23 | 58.39 | 79.54 |
| P3 | 111.33 | 87.33 | 0.90 | 1.15 | 57.87 | 73.77 |
| P1 | 118.67 | 97.33 | 0.84 | 1.03 | 54.29 | 66.19 |
| P1 | 102.00 | 83.33 | 0.98 | 1.20 | 63.16 | 77.31 |
| P1 | 103.00 | 81.00 | 0.97 | 1.23 | 62.55 | 79.54 |
| P1 | 109.33 | 91.67 | 0.91 | 1.09 | 58.93 | 70.29 |
| P1 | 107.00 | 91.00 | 0.93 | 1.10 | 60.21 | 70.80 |
| P1 | 122.00 | 98.33 | 0.82 | 1.02 | 52.81 | 65.52 |
| Q | 108.67 | 88.67 | 0.92 | 1.13 | 59.29 | 72.66 |
| R | 105.67 | 83.67 | 0.95 | 1.20 | 60.97 | 77.01 |
| S | 104.67 | 84.00 | 0.96 | 1.19 | 61.56 | 76.70 |
| T | 102.67 | 83.33 | 0.97 | 1.20 | 62.75 | 77.31 |

Comparative Example 1

Water (35 pounds, 15.9 kg) was heated to 180° F. (82° C.) in a stirred, jacketed kettle. To the heated water, potassium chloride (6 pounds, 2.7 kg) and sodium chloride (9 pounds, 4.1 kg) were added, stirred, and dissolved. Next, citric acid (0.22 pounds, 100 g) was added followed by the slow addition of maltodextrin (6 pounds, 2.7 kg) in small amounts, which dissolved slowly into the solution. The pH of the formulation was measured at 2.16. The completed solution was then transferred to a stainless steel vessel, through which it was pumped into the spray dryer. The spray-dried formulation was packed and stored in plastic, resealable bags.

Figure 4A:
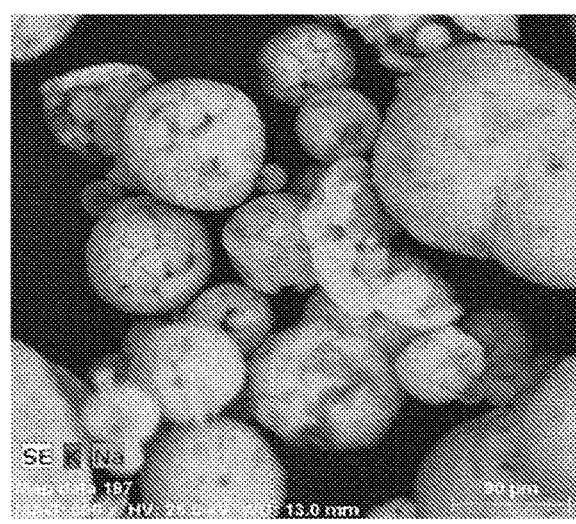
FIGS. 4A and 4B show EDS and SEM images, respectively, of the comparative salt substitute prepared as described in Comparative Example 1.
Figure 4B:
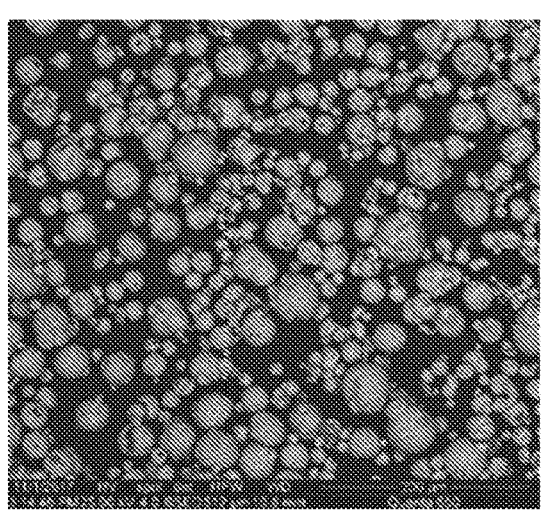

FIGS. 4A and 4B show EDS and SEM images, respectively, of the salt substitute of Comparative Example 1. The salt substitute is in the form of homogenous particles, where portions of particles correspond to potassium, and portions of particles correspond to sodium. Particles do not include regions consisting essentially of potassium chloride and regions consisting essentially of sodium chloride in direct contact. The scale bars in FIGS. 4A and 4B are 90 μm and 200 μm, respectively. The magnification in FIG. 4B is 150×.

A number of embodiments have been described. Nevertheless, it will be understood that various modifications may be made without departing from the spirit and scope of the disclosure. Accordingly, other embodiments are within the scope of the following claims.

What is claimed is:

1. A salt substitute precursor comprising:
    water;
    a chloride salt, wherein the chloride salt comprises potassium chloride;
    a food grade acid; and
    an anticaking agent,
    wherein a pH of the salt substitute precursor is between 2 and 4, wherein the salt substitute precursor is free of a carrier, and the salt substitute precursor is a saturated or supersaturated solution, a suspension, or a slurry.

2. The salt substitute precursor of claim 1, wherein the food grade acid comprises at least one of acetic acid, ascorbic acid, benzoic acid, citric acid, succinic acid, fumaric acid, lactic acid, malic acid, tartaric acid, lemon juice, hydrochloric acid, and phosphoric acid.

3. The salt substitute precursor of claim 1, wherein the anticaking agent comprises at least one of sodium aluminosilicate, sodium ferrocyanide, potassium ferrocyanide, calcium carbonate, magnesium carbonate, tricalcium phosphate, and silicon dioxide.

4. The salt substitute precursor of claim 1, wherein the chloride salt further comprises sodium chloride.

5. The salt substitute precursor of claim 1, wherein a pH of the salt substitute precursor is between 3 and 4.

6. The salt substitute precursor of claim 1, wherein the salt substitute precursor is a homogeneous solution.

7. The salt substitute precursor of claim 1, wherein the water comprises less than 80 wt % of the salt substitute precursor.

8. The salt substitute precursor of claim 7, wherein the water comprises less than 70 wt % of the salt substitute precursor.

9. The salt substitute precursor of claim 8, wherein the water comprises less than 50 wt % of the salt substitute precursor.

10. The salt substitute precursor of claim 9, wherein the water comprises less than 25 wt % of the salt substitute precursor.

11. A method of making a salt substitute, the method comprising:
    forming a salt substitute precursor comprising a mixture of:
        water;
        a chloride salt, wherein the chloride salt comprises potassium chloride;
        a food grade acid; and
        an anticaking agent,
        wherein a pH of the salt substitute precursor is between 2 and 4, wherein the salt substitute precursor is free of a carrier, and the salt substitute precursor is a saturated or supersaturated solution, a suspension, or a slurry, providing the salt substitute precursor to a centrifuge; and
    centrifuging the salt substitute precursor to yield a salt substitute in the form of a solid and a centrate.

12. The method of claim 11, wherein a temperature of the salt substitute precursor provided to the centrifuge is less than 240° F.

13. The method of claim 11, further comprising washing the salt substitute with the centrate.

14. The method of claim 11, wherein the chloride salt further comprises sodium chloride, and the salt substitute is in the form of a combined crystalline solid comprising particles, wherein each particle of the combined crystalline solid comprises a region consisting essentially of potassium chloride in direct contact with a region consisting essentially of sodium chloride.

* * * * *